(12) United States Patent
Doetsch et al.

(10) Patent No.: US 7,450,630 B2
(45) Date of Patent: Nov. 11, 2008

(54) MOBILE RADIO TELEPHONE RECEIVER

(75) Inventors: Markus Doetsch, Schliern (CH); Tideya Kella, München (DE); Peter Schmidt, Erpolzheim (DE); Peter Jung, Otterberg (DE); Jörg Plechinger, München (DE); Michael Schneider, München (DE)

(73) Assignee: Infineon Technologies AG, Munich (DE)

( * ) Notice: Subject to any disclaimer, the term of this patent is extended or adjusted under 35 U.S.C. 154(b) by 1655 days.

(21) Appl. No.: 09/809,788

(22) Filed: Mar. 16, 2001

(65) Prior Publication Data
US 2001/0036222 A1 Nov. 1, 2001

(30) Foreign Application Priority Data
Mar. 16, 2000 (DE) ................. 100 12 875

(51) Int. Cl.
*H04B 1/00* (2006.01)
(52) U.S. Cl. .................. 375/148; 375/285; 375/316; 375/340
(58) Field of Classification Search .............. 375/144, 375/146, 147, 148, 260, 207, 295, 316, 140, 375/285, 324, 346, 340, 351, 366; 455/3.01, 455/3.02, 101, 132, 133, 509, 522, 525, 63.1, 455/65, 130, 225, 226.1–226.4, 134, 135, 455/296; 370/357, 360
See application file for complete search history.

(56) References Cited

U.S. PATENT DOCUMENTS 5,793,796 A * 8/1998 Hulbert et al. .............. 375/206
6,295,311 B1 * 9/2001 Sun ............................. 375/147
6,370,397 B1 * 4/2002 Popovic et al. .............. 455/561
6,373,882 B1 * 4/2002 Atarius et al. ............... 375/148
6,473,454 B1 * 10/2002 Nagazumi .................... 375/153
6,579,526 B1 * 6/2003 Perron et al. ............. 424/204.1
6,618,434 B2 * 9/2003 Heidari-Bateni et al. .... 375/148
6,625,202 B1 * 9/2003 Sudo et al. .................. 375/147
6,628,698 B1 * 9/2003 Oda ............................. 375/147
6,760,566 B1 * 7/2004 Wright et al. ............... 455/13.4

FOREIGN PATENT DOCUMENTS

DE 197 18 942 A1 11/1997
DE 198 24 218 C1 3/2000
DE 198 45 620 A1 4/2000

OTHER PUBLICATIONS

K.D. Kammeyer et al.: "Nachrichtenübertragung" ["Transmission of Information"], Stuttgart, 1996, 2nd edition, pp. 658-684.

* cited by examiner

Primary Examiner—Chieh M. Fan
Assistant Examiner—Jaison Joseph
(74) Attorney, Agent, or Firm—Laurence A. Greenberg; Werner H. Stemer; Ralph E. Locher

(57) ABSTRACT

A data processing device in a mobile radio telephone receiver contains a RAKE receiver portion with RAKE fingers and a path search and evaluation device for detecting paths of the air interface which must be allocated to the individual RAKE fingers and for estimating one or more parameters with respect to each detected path. A finger selection and power consumption reduction device performs a clock rate reduction or disconnects individual RAKE fingers in consideration of the path parameters.

4 Claims, 3 Drawing Sheets

MOBILE RADIO TELEPHONE RECEIVER

BACKGROUND OF THE INVENTION

Field of the Invention

The present invention relates to a device and a method for processing a digital data signal that is transmitted over time-variant paths of an air interface in a mobile radio receiver. The device contains a RAKE receiver portion with a number of fingers and a path search and evaluation device for finding paths of the air interface which must be allocated to the fingers and for estimating at least one parameter with respect to each detected path.

In mobile radio telephony, radio signals undergo multipath propagation; i.e., multiple signal reception versions occur at the receiver owing to reflection, dispersion, and diffraction of the transmitted radio signal at diverse obstacles in the path of propagation, which versions are staggered in time and attenuated to varying degrees. The functional principle of a RAKE receiver is based on separately evaluating several of these reception signal versions (paths) and then heterodyning them on time. The acronym RAKE visually describes the structure of this type of receiver, with the "tines" of the rake representing the RAKE fingers, and the "handle" of the rake representing the heterodyned reception signal that is released at the output side.

Excellent detection results can be obtained using RAKE receivers. However, their high power consumption is disadvantageous, this being attributable to the parallel structure of the RAKE fingers and the consequent multiplication of the signal processing outlay.

Various RAKE receivers are described in the book titled "Nachrichtenuebertragung" (K. D. Kammeyer, B. G. Teubner, Stuttgart, 1996, 2. ed:658-684), which represents the closest prior art. According to this reference, a weighted path summation is advantageous in RAKE receivers to the extent that the total reception energy is distributed unevenly across the detected paths (i.e. the fingers of the RAKE receiver). In this way, it is possible to reduce the noise of the RAKE receiver but not the power consumption.

SUMMARY OF THE INVENTION

It is accordingly an object of the invention to provide a mobile radio telephone receiver that overcomes the above-mentioned disadvantages of the prior art devices of this general type, which has optimal low power consumption. The invention is also aimed at the object of laying out a method for signal processing in a mobile radio receiver containing a RAKE receiver portion which makes it possible to reduce the power consumption in the operation of the RAKE receiver portion.

With the foregoing and other objects in view there is provided, in accordance with the invention, a device for processing a data signal that is transmitted over time variant paths of an air interface in a mobile radio receiver. The device contains a rake receiver portion having a number of fingers and a path search and evaluation device for finding paths of the air interface which must be allocated to the fingers and for estimating at least one parameter with respect to each detected path. The path search and evaluation device is connected to the RAKE receiver portion. A rake finger selection and power consumption reduction device is connected to the rake receiver portion and to the path search and evaluation device. The rake finger selection and power consumption reduction device selects at least one of the fingers in dependence on the parameter and carries out a reduction of power consumption in a selected finger of the fingers.

A RAKE receiver portion with adaptive power consumption is created by selectively reducing the power consumption in one or more RAKE fingers in consideration of the one or more estimated path parameters. In other words, the power consumption of the RAKE receiver portion can be adapted to the instantaneous state of the mobile radio channel and thereby minimized. When a single path or a few paths emerge as dominant, the invention makes it possible to reduce the power consumption of "inefficient" RAKE fingers, which may slightly degrade the overall detection result, though the power consumption can be reduced significantly.

The power consumption in a RAKE finger can be reduced by reducing its clock rate or disconnecting the finger completely.

A first preferred embodiment of the invention is characterized in that the decision that is made by the RAKE finger selection and power consumption reduction device as to whether or not to select a particular RAKE finger is made under sole consideration of the parameter or parameters allocated to this finger. For instance, in this case an estimated path energy can be consulted as the parameter of the path, and the corresponding rake finger can be operated at a reduced clock rate or cut off as soon as the estimated path energy of the path that is allocated to this RAKE finger is less than a predetermined threshold value. In this way, only signal components with sufficiently high energy are used for the data processing in the RAKE receiver portion.

A second embodiment of the invention is characterized in that the RAKE finger selection and power consumption reduction device decides whether or not to select a particular RAKE finger upon sole consideration of the parameter or parameters allocated to the finger and other fingers. In this embodiment (as opposed to the first), because path parameters of the other fingers are taken into account, the power consumption reduction of the specified RAKE finger can be decided using a relative criterion.

In a first expedient variant of the second embodiment, the RAKE finger selection and power consumption device cuts off a RAKE finger when the estimated path energy of the path allocated to this RAKE finger is less than a threshold value that is a function of a mean value of estimated path energies and a variance of the estimated path energies.

A (relative) delay time criterion can be consulted with regard to the question of the selection of the specified RAKE finger instead of and/or in addition to a (relative) energy criterion. Accordingly, the RAKE finger selection and power consumption device selects a RAKE finger when the estimated path delay time of the path that is allocated to this RAKE finger falls within a time interval that contains the path delay time of that path among the evaluated paths which has the largest estimated path energy, with the limits of the time interval being dependent on the time distribution of the estimated path delay times.

In accordance with another feature of the invention, the limits of the time interval, besides being dependent upon the time distribution of the estimated path delay times, are also dependent upon the estimated path energies corresponding to the evaluated paths.

With the foregoing and other objects in view there is provided, in accordance with the invention, a method for processing a digital data signal that is transmitted over time variant paths of an air interface in a mobile radio receiver containing a rake receiver portion having a number of rake fingers. The method includes using a path search and evaluation device for assisting in repeatedly detecting paths of the air interface that are to be allocated to the rake fingers. An estimation of at least one parameter is performed for each detected path. A rake finger selection and power consumption reduction device is used for assisting in selecting at least one of the rake fingers based on the parameter. A power consumption of a selected rake finger is then reduced.

Other features which are considered as characteristic for the invention are set forth in the appended claims.

Although the invention is illustrated and described herein as embodied in a mobile radio telephone receiver, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
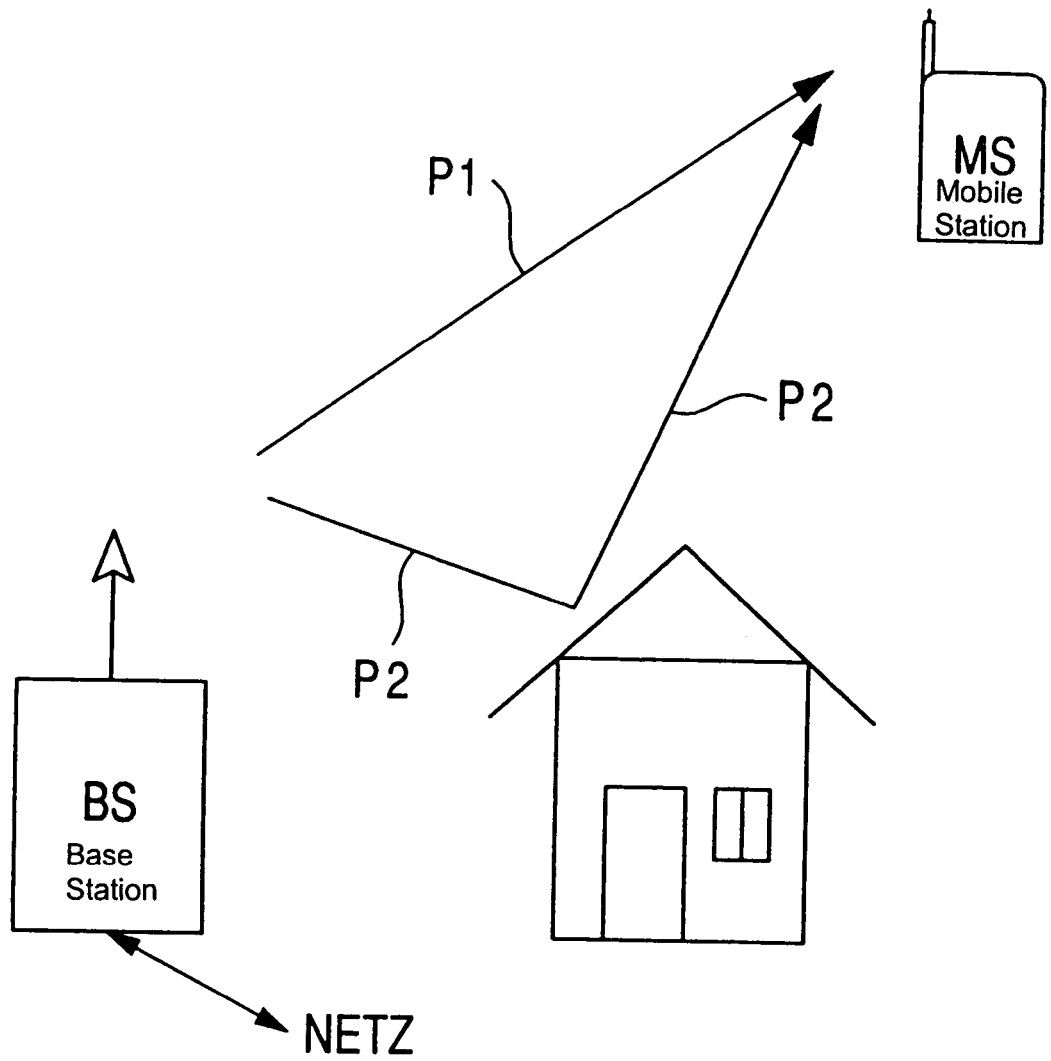
FIG. 1 is a schematic representation of an air interface of a mobile radio system having a mobile station and a base station.

DESCRIPTION OF THE PREFERRED EMBODIMENTS:

In all the figures of the drawing, sub-features and integral parts that correspond to one another bear the same reference symbol in each case. Referring now to the figures of the drawing in detail and first, particularly, to FIG. 1 thereof, there is shown a configuration of an air interface of a cellular mobile radio telephone system. A mobile station MS that is allocated to a specific subscriber enjoys radio contact with a base station BS. The radio link undergoes multipath propagation in both the uplink and downlink directions (from MS to BS and vice versa); that is, a radio signal that is sent by a transmitter can reach the receiver on various communication paths P1, P2, . . . of the air interface (here represented for the downlink path). Owing to reflection, dispersal, and diffraction, the individual paths P1, P2 . . . have different transmission characteristics and can be viewed as independent communication channels. In particular, these communication channels (paths) have different radio signal transit times. As a result, the versions of the reception signal that are transmitted over the paths P1 and P2 reach the mobile radio receiver MS phase-shifted, with different energies (henceforth referred to as path energies), and time-shifted (the time delay relative to the common time base is henceforth referred to as path delay time).

Figure 2:
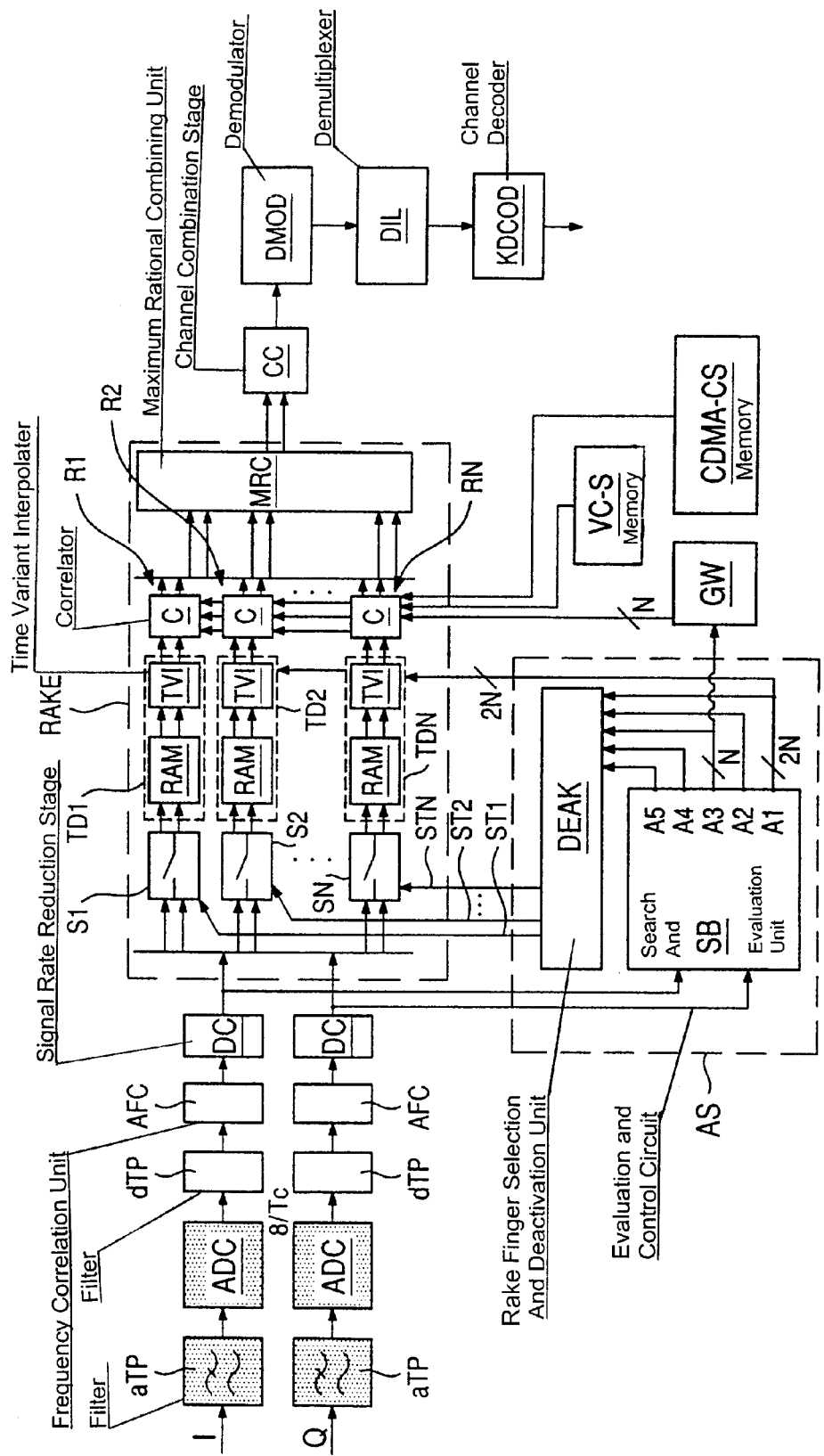
FIG. 2 is a block circuit diagram of a baseband portion of a CDMA mobile radio receiver according to the invention.

FIG. 2 shows a block circuit diagram of a baseband portion of a reception circuit that is realized in the mobile station MS. The following description relates to a code division multiple access (CDMA) receiver, though the inventive device can also be realized in a receiver that employs some other multiplex method of subscriber separation.

At an input of the baseband portion, an analog inphase I signal component and an analog quadrature Q signal component of a received data signal are provided. The analog I and Q signal components are generated in the conventional manner (not illustrated) by down-mixing the received analog antenna signal with identical carrier frequencies that are phase-shifted 90° relative to one another.

The analog I and Q signal components each pass through an analog low-pass filter aTP and are subsequently digitized in analog-digital converters ADC. The digitization is accomplished at a sufficiently high sampling rate; e.g., with the 8-fold chip rate $8/T_c$ given a CDMA coded data signal. $T_c$ designates the duration of a CDMA code element (what is known as the chip). In the Universal Mobile Telecommunication System (UMTS) mobile radio/telephone system, $T_c$ equals approx. 0.24 µs.

The I and Q digital signals outputted by the analog-digital converters ADC are conducted to digital low-pass filters dTP. The digital low-pass filters dTP can be root raised cosine (RRC) low-pass filters, for example.

In the signal paths downstream of the digital low-pass filters dTP, respective frequency correction units AFC are disposed, which carry out an automatic frequency correction of the filtered I and Q digital signals. Temperature-dependent or pressure-dependent frequency drifts of the local oscillator of the reception circuit are compensated by the frequency correction.

In the signal paths downstream of the frequency correction units AFC, signal rate reduction stages DC may be disposed, which reduce the signal rate in the I and Q branches to e.g. $2/T_c$. The resolution of the data signals can equal 8 bits at this location.

The I and Q data signals with reduced signal rates are fed to a RAKE receiver portion RAKE of the given mobile station MS. The RAKE receiver portion RAKE is delineated in FIG. 2 by a dotted line.

The RAKE receiver portion RAKE contains a number of parallel fingers R1, R2, . . . , RN. As is already known, the basic principle of the RAKE receiver consists in the allocation of each RAKE finger R1, R2, . . . , RN to precisely one path (communication channel) P1, P2, . . . , PN of the air interface. Each RAKE finger R1, R2, . . . , RN in the present example has two channels (for the I and Q branches), which is indicated by double arrows in the signal paths.

N is the constructionally predetermined maximum number of paths P1, P2, . . . , PN that are to be processed by the RAKE receiver portion RAKE.

In principle, the detection quality of the RAKE receiver RAKE is higher the more paths that can be taken into consideration in the detection process; i.e., the greater the value N. In any case, the rising power consumption as N increases is problematic for RAKE receivers that are used in the mobile stations MS.

Each of the RAKE fingers R1, R2, . . . , RN in the present example has a switch S1, S2, . . . , SN at the input side by which the corresponding RAKE finer R1, R2, . . . RN can be activated and deactivated in dependence upon a control signal ST1, ST2, . . . , STN. In the signal path behind the respective switch S1, S2 . . . SN there is a (dual channel) time delay stage TD1, TD2 . . . TDN formed of a random access memory RAM and a time-variant interpolator TVI connected in series therewith. A (dual channel) correlator (multiplier) C is connected in series with each time delay stage TD1, TD2 . . . TDN. The I/Q output data signals of the RAKE fingers R1, R2 . . . RN are fed to a two-channel maximum rational combining (MRC)

unit MRC. This functions like an adder and combines the I/Q output data signals of the RAKE fingers into a total I signal and a total Q signal.

The two channels (I and Q branches) of the RAKE total data signal that are available at the output of the two-channel MRC unit are combined in consideration of their phase displacement into a single RAKE total data signal in a channel combination stage CC and are demodulated by a demodulator DMOD. To the extent that multiplexing (interleaving) was performed at the sender side, the demodulated RAKE total data signal is demultiplexed in a demultiplexer DIL. Next, an adaptive detection (i.e. adapted to the condition of the overall communication channel) of the transmitted data symbols is performed in a channel decoder KDCOD. At the output of the channel decoder KDCOD the reconstructed versions of the transmitted data symbols are provided.

The CDMA radio receiver also contains a CDMA code memory CDMA-CS and a scrambling code memory VC-S. The CDMA code memory CDMA-CS is provided for storing a plurality of CDMA codes $C_i$ (i=1,2, ...), and the scrambling code memory VC-S is provided for storing a plurality of scrambling codes $V_i$ (i=1,2 ...).

Each CDMA code $C_i$ is an identification for a subscriber-specific data channel (or for other channels, for instance a control channel), and each scrambling code $V_i$ is an identification for a specific base station BS. In operation, both the CDMA code $C_i$ that is allocated to the subscriber for the respective conversation and the scrambling code V signifying the base station BS in communication with the mobile station are fed to the correlators C.

Furthermore, the CDMA radio receiver contains an evaluating and control circuit AS. The evaluating and control circuit AS contains a search and evaluation unit SB as well as a RAKE finger selection and deactivation unit DEAK.

The search and evaluation unit SB is disposed parallel to the RAKE receiver portion RAKE; that is, it receives the I and Q input data signals of the RAKE receiver portion RAKE at its two inputs. It has five outputs A1, A2, ..., A5, for instance, at which the below listed path parameters are released.

At the first output Al, the estimated path delay times $\tau 1$, $\tau 2$, ..., $\tau N$ of N (or more than N, generally speaking) paths that have been detected in the search and evaluation unit SB are outputted.

At the second output A2, a parameter that is characteristic of the time distribution of the estimated path delay times $\tau 1$, $\tau 2$, ..., $\tau N$ is outputted. This can be a matter of the variance $\sigma^2(\tau)$ or what is known as the delay spread S (which depends on the path energies).

At the third output A3, the respective estimated path energies E1, E2, ..., EN for all (for instance N) detected paths are outputted.

At the fourth output A4, the mean value $\mu(E)$ of all (e.g. N) estimated path energies is outputted, and at the fifth output A5, the variance $\sigma^2(E)$ of all (for instance N) estimated path energies is outputted.

In the present example, the estimated path delay times $\tau 1$, $\tau 2$, ..., $\tau N$ that are released at the first output A1 consist of two portions, that is $\tau i = \tau i(G) + \tau i(F)$, where i=1, 2, ..., N. The first portion $\tau i(G)$ is a value for the respective path delay time $\tau i$, which is obtained in the course of a rough determination with a lower accuracy than $T_c$, and the second portion $\tau i(F)$ is a correction value less than $T_c$, which is computed in the course of a fine determination of the respective path delay time $\tau i$.

The rough and fine determinations of the path delay times $\tau 1, \tau 2, \ldots, \tau N$ are performed in the search and evaluation unit SB by two non-illustrated correlators. To determine the rough portions $\tau i(G)$, the I/Q input data signals are correlated with a pilot signal sequence that is known in the receiver and that is transmitted by the sending base station BS in continuous repetition at the beginning of each data block. In an abstract sense, the spread and scrambled pilot signal sequence that is known to the search and evaluation unit SB is "pushed off" over a temporarily stored data sequence of the I/Q input data signals; the occurrence of a correlation is interpreted as the detection of a path; and the position of the pilot signal sequence relative to the temporarily stored data sequence upon the occurrence of the correlation is noted with reference to a common time base as $\tau i(G)$.

The determination of the fine portion $\tau i(F)$ is based on the 2-fold oversampling of the received I/Q input data signals and is performed in a known fashion by what is known as an early-late correlator.

The path energies E1, E2, ... EN of the individual paths that are released at the third output A3 are estimated in a known fashion by a self-correlation of the I/Q input data signals in consideration of the computed path delay times $\tau i$.

The path parameters released at the remaining outputs A2, A4, and A5 are derive by calculation from the previously described path parameters (outputs A1 and A3).

The path parameters that are released at the outputs A1, A2, ..., A5 of the search and evaluation unit SB are fed to the RAKE finger selection and deactivation device DEAK. On the basis of these parameters, the device DEAK generates the control signals ST1, ST2, ..., STN for activating and deactivating the individual RAKE fingers R1, R2, ..., RN by use of the switches S1, S2, ..., SN.

The parameters at the output of the search and evaluation unit SB pertaining to the path delay times $\tau 1, \tau 2, \ldots, \tau N$ are additionally fed to the time delay stages TD1, TD2, ..., TDN of the individual RAKE fingers R1, R2, ..., RN. The approximate portions $\tau i(G)$ are realized in the form of read instructions for the memories RAM. These read instructions indicate (different) memory areas that are to be simultaneously read in the individual memories RAM. Thus, the data signal components that are transmitted over the individual paths P1, P2, ... PN of the air interface are thus available at the outputs of the memories RAM on time (at a 2-fold chip rate) with a maximum time precision of $T_c$. In other words, the search and evaluation unit SB performs a rough synchronization of the RAKE fingers R1, R2, ..., RN by use of the rough portions $\tau 1(G), \tau 2(G), \ldots, \tau N(G)$ in conjunction with the memories RAM.

The fine synchronization of the RAKE fingers R1, R2, ..., RN is managed by the interpolators TVI. For instance, the interpolators TVI can be realized as LaGrange interpolators. Each interpolator TVI takes the fine portion $\tau i(F)$ of the path delay time $\tau i$ that is specified for it and performs a recalculation of the data values with respect to interpolation points (interpolated sampling times), e.g. by LaGrange interpolation. In the signal path behind the interpolators TVI, the RAKE fingers R1, R2, ..., RN are synchronized with a time precision $<< T_c$.

The estimated path energies E1, E2, ..., EN (output A3) are also fed to a weighting unit GW (which is optional). The weighting unit GW calculates a weight factor g1, g2, ... gN for each path, which also grows as the path energy increases. Each weight factor g1, g2, ..., gN is transferred to the correlator C in the appertaining RAKE finger R1, R2, ..., RN, with the result that "energy-rich" paths (to the extent that they are active) are paid greater consideration in the RAKE receiver portion than energy-weak paths.

In accordance with a first embodiment of the invention, the RAKE finger selection and deactivation device DEAK only takes the path parameters E1, E2, ..., EN that are released at the output A3. Of the N (or more than N) detected paths, those paths are selected whose path energy Ei satisfies the inequality Ei>Es.

This is a provided threshold value for a minimal path energy.

Figure 3:
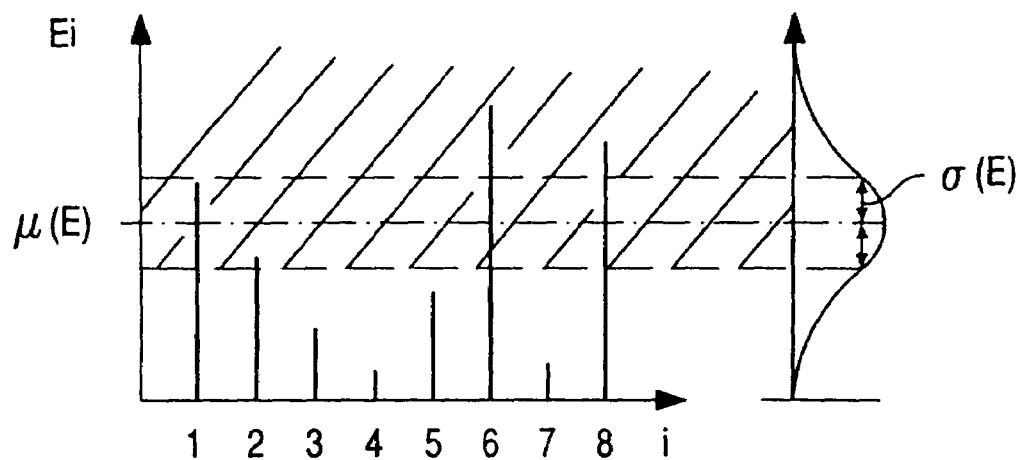
FIG. 3 is a graph of estimated path energy over a path number, for purposes of illustrating a first variant of a second embodiment of the invention.

Next, with reference to FIG. 3 the manner of operation of the RAKE finger selection and deactivation unit DEAK is detailed in accordance with a first variant of the second embodiment of the invention. In this variant, the RAKE finger selection and deactivation device DEAK takes the path and evaluation parameters that are released at the outputs A3, A4 and A5 of the search and evaluation unit SB. Of the N (e.g. N=8) detected paths P1, P2, ..., P8, those paths are selected whose path energies Ei satisfy the inequality Ei>μ(E)-σ(E).

In the example illustrated in FIG. 3, the paths i=1,2,6,8 whose estimated energies lie in the hatched area are selected, whereas the paths i=3,4,5,7 are rejected. The control signals ST1, ST2, ST6, ST8 are set by the RAKE finger selection and deactivation device DEAK in such a way that the corresponding switches S1, S2, S6, S8 are closed. On the other hand, an opening of the switches S3, S4, S5, S7 is effectuated by the control signals ST3, ST4, ST5, ST8; i.e., the corresponding RAKE fingers R3, R4, R5 and R7 are deactivated. This procedure guarantees that only the paths that are richest in energy are used for the data evaluation in the RAKE receiver portion RAKE.

The distribution of the estimated path energies with respect to the 8 paths is represented on the right side of FIG. 3.

A second variant of the second embodiment is detailed with reference to FIG. 4. In this variant, the path parameters that are released at the outputs A1, A2, and A3 of the search and evaluation unit SB are transferred to the RAKE finger selection and deactivation device DEAK.

The RAKE finger selection and deactivation unit DEAK first computes a path Pm having the maximum path energy among the detected paths. The maximum path energy is thus Em.

The estimated path delay time of the path Pm having maximum path energy Em is τm. Next, besides the path Pm, exclusively those paths Pi that satisfy the condition σ(τ)>|τm−τi| are used for the signal processing in the RAKE receiver portion RAKE.

A second possibility consists in selecting only those paths Pi for which the condition S>|τm−τi| is satisfied.

Figure 4:
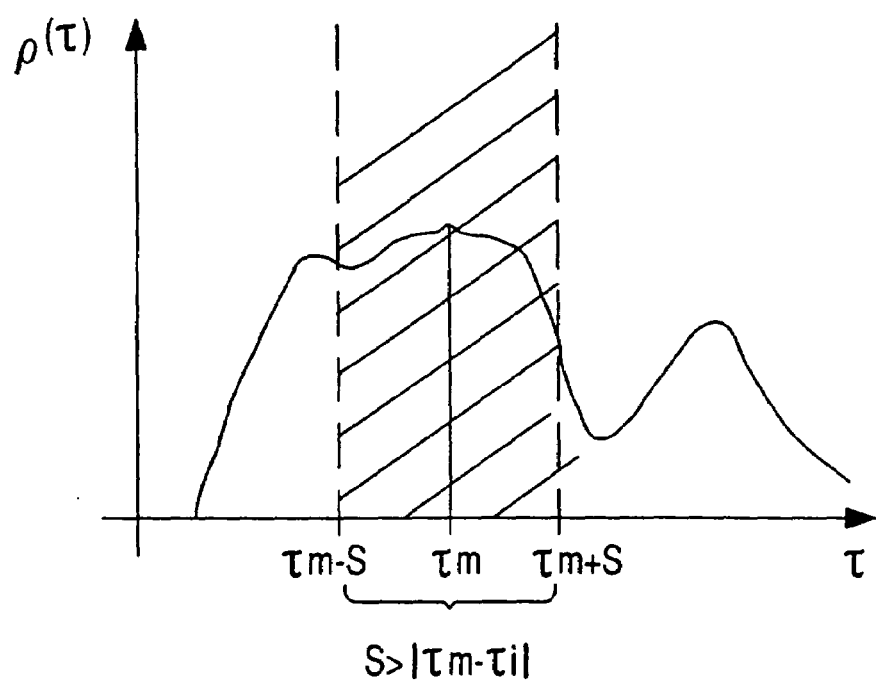
FIG. 4 is a graph of a delay power spectrum over a path delay time, for the purpose of illustrating a second variant of the second embodiment of the invention.

FIG. 4 serves to illustrate the second possibility. The graph plots the continuous delay power spectrum σ(τ) of the mobile radio channel over the path delay time τ. The definition of the delay spread S derives from this spectrum according to the equation $S=2\sqrt{\mu_2},$ with $$\mu_2 = \frac{1}{P}\int_{-\infty}^{+\infty} \tau^2 \rho(\tau)d\tau - \left[\frac{1}{P}\int_{-\infty}^{+\infty} \tau \cdot \rho(\tau)d\tau\right]^2$$

$$P = \int_{-\infty}^{+\infty} \rho(\tau)d\tau$$

($\mu_2$ is also designated as a second central moment of the delay power spectrum σ(τ); P designates the total power).

Since only discrete energy values, and not continuous power signals, are available in the receiver, S is estimated in the search and evaluation unit SB on the basis of these discrete energy values.

Next, on the basis of the estimated delay spread S (at the output A2 of SB), the paths having delay times in the hatched region are selected, whereas the remaining paths are used for the signal evaluation only with a reduced RAKE finger clock rate, or not at all.

It is noted that there are a number of additional appropriate energetic and/or time selection criteria besides the exemplarily described selection criteria that also realize the inventive principle.

In the above described reception circuit, the power saving was realized by the complete shutdown of the nonselected RAKE fingers. If a clock pulse reduction in these RAKE fingers is provided instead, this can be achieved by providing a RAKE finger selection and clock rate reduction device instead of the RAKE finger selection and deactivation device DEAK. In this case the switches S1, S2, ..., SN in the respective RAKE fingers R1, R2, ..., RN are replaced by decimators, which bring about a signal rate reduction in the respectively allocated RAKE fingers that can be adjusted in a purposeful manner.

It is common to all embodiments and variants of the invention that the situative power throttling or deactivation of individual RAKE fingers R1, R2, ..., RN effectuates power savings that make possible a longer power-on time or life of the rechargeable batteries of the mobile station MS relative to a charge cycle.

We claim:

1. A device for processing a data signal that is transmitted over time variant paths of an air interface in a mobile radio receiver, the device comprising:
   a rake receiver portion having a number of fingers;
   a path search and evaluation device for finding paths of the air interface which must be allocated to said fingers and for estimating at least a path energy with respect to each detected path, said path search and evaluation device connected to said rake receiver portion;
   a rake finger selection and power consumption reduction device for selecting at least one of said fingers and to carry out a reduction of power consumption in a selected finger of said fingers, said rake finger selection and power consumption reduction device connected to said rake receiver portion and said path search and evaluation device; and
   said rake finger selection and power consumption reduction device selecting a finger of said fingers if an estimated path energy of a path that is allocated to said finger is less than a threshold value that is a function of a mean value of estimated path energies and a variance of the estimated path energies of said fingers, said threshold value being based on the difference between the mean value of the estimated path energies and the square root of the variance of the estimated path energies of said fingers.

2. The device according to claim 1, wherein the rake finger selection and power consumption reduction device includes a decimator configured to reduce the power consumption of a selected rake finger by reducing a clock rate of the selected rake finger.

3. A method for processing a digital data signal that is transmitted over time variant paths of an air interface in a mobile radio receiver containing a rake receiver portion having a number of rake fingers, which comprises the steps of:

using a path search and evaluation device for assisting in repeatedly detecting paths of the air interface that are to be allocated to the rake fingers, an estimation of at least a path energy being performed for each detected path;

using a rake finger selection and power consumption reduction device for assisting in selecting at least one of the rake fingers based on the path energy, the rake finger selection and power consumption reduction device selecting a respective rake finger of the rake fingers if an estimated path energy of a path that is allocated to the respective rake finger is less than a threshold value that is a function of a mean value of all estimated path energies and a variance of all the estimated path energies of the rake fingers, said threshold value being based on the difference between the mean value of the estimated path energies and the square root of the variance of the estimated path energies of said fingers; and reducing a power consumption of a selected rake finger.

4. The method according to claim 3, wherein the reduction in power consumption of a selected rake finger is accomplished by reducing a clock rate of the selected rake finger.

\* \* \* \* \*

UNITED STATES PATENT AND TRADEMARK OFFICE
CERTIFICATE OF CORRECTION

PATENT NO. : 7,450,630 B2
APPLICATION NO. : 09/809788
DATED : November 11, 2008
INVENTOR(S) : Markus Dötsch et al.

It is certified that error appears in the above-identified patent and that said Letters Patent is hereby corrected as shown below:

Column 7,
Line 62, "power spectrum $\sigma(\tau)$" should read -- power spectrum $\rho(\tau)$ --

Column 8,
Line 11, "power spectrum $\sigma(\tau)$" should read -- power spectrum $\rho(\tau)$ --

Signed and Sealed this

Twenty-fourth Day of February, 2009

JOHN DOLL
*Acting Director of the United States Patent and Trademark Office*